(12) United States Patent
Chu

(10) Patent No.: US 8,252,445 B2
(45) Date of Patent: Aug. 28, 2012

(54) BATTERY LOCK AND ELECTRONIC APPARATUS WITH BATTERY LOCK

(75) Inventor: Yung-Hung Chu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 359 days.

(21) Appl. No.: 12/579,420

(22) Filed: Oct. 15, 2009

(65) Prior Publication Data

US 2011/0052955 A1    Mar. 3, 2011

(30) Foreign Application Priority Data

Aug. 31, 2009    (CN) .......................... 2009 1 0306377

(51) Int. Cl.
| | |
|---|---|
| *H01M 2/10* | (2006.01) |
| *H02B 1/00* | (2006.01) |
| *H05K 5/00* | (2006.01) |
| *H05K 7/00* | (2006.01) |
| *H04B 1/034* | (2006.01) |
| *H04B 1/08* | (2006.01) |

(52) U.S. Cl. ..... 429/100; 429/97; 361/600; 361/679.01; 455/128; 455/347

(58) Field of Classification Search ............ 429/97, 429/100; 361/600, 679.01; 455/128, 347
See application file for complete search history.

(56) References Cited

U.S. PATENT DOCUMENTS

| 7,419,742 B2 * | 9/2008 | Liu et al. ......................... 429/97 |
| 2004/0214077 A1 * | 10/2004 | Huang .............................. 429/97 |
| 2006/0172183 A1 * | 8/2006 | Chen et al. ...................... 429/97 |
| 2007/0010219 A1 * | 1/2007 | Qin et al. ...................... 455/128 |

* cited by examiner

*Primary Examiner* — Basia Ridley
*Assistant Examiner* — Sean P Cullen
(74) *Attorney, Agent, or Firm* — Altis Law Group, Inc.

(57) ABSTRACT

A battery lock for locking a battery of an electronic apparatus is provided. The battery lock includes a sliding button and a sliding member. The sliding button includes a sliding part for sliding the battery lock. The sliding member includes a base part and a side part extended from the base part. The sliding button is assembled on the base part of the sliding member detachably. At least one pushing part are fixed on the side part of the sliding member to lock the battery of the electronic apparatus.

2 Claims, 10 Drawing Sheets

BATTERY LOCK AND ELECTRONIC APPARATUS WITH BATTERY LOCK

BACKGROUND

1. Technical Field

The disclosure relates to a battery lock and an electronic apparatus with the battery lock.

2. Description of Related Art

Commonly, to install and replace batteries in an electronic apparatus, screws must be removed then replaced, which is inconvenient.

BRIEF DESCRIPTION OF THE DRAWINGS

The components of the drawings are not necessarily drawn to scale, the emphasis instead being placed upon clearly illustrating the principles of a battery lock and an electronic apparatus with the battery lock. Moreover, in the drawings, like reference numerals designate corresponding parts throughout several views.

DETAILED DESCRIPTION

Figure 1:
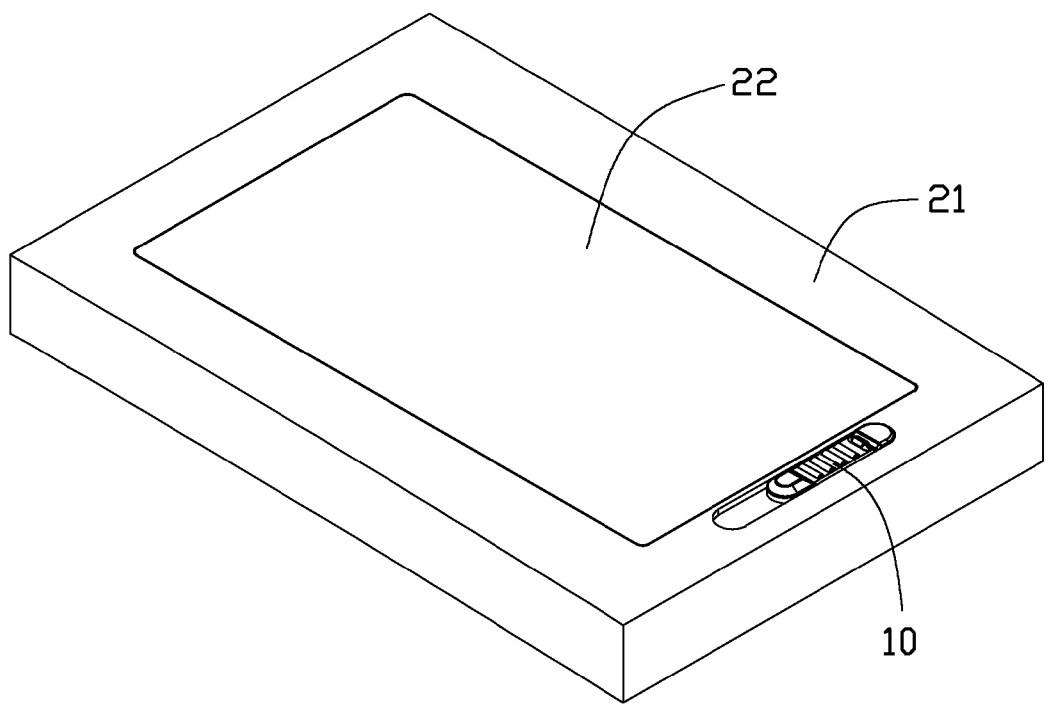
FIG. 1 is an isometric view of an electronic device with a battery lock in accordance with one embodiment.
Figure 2:
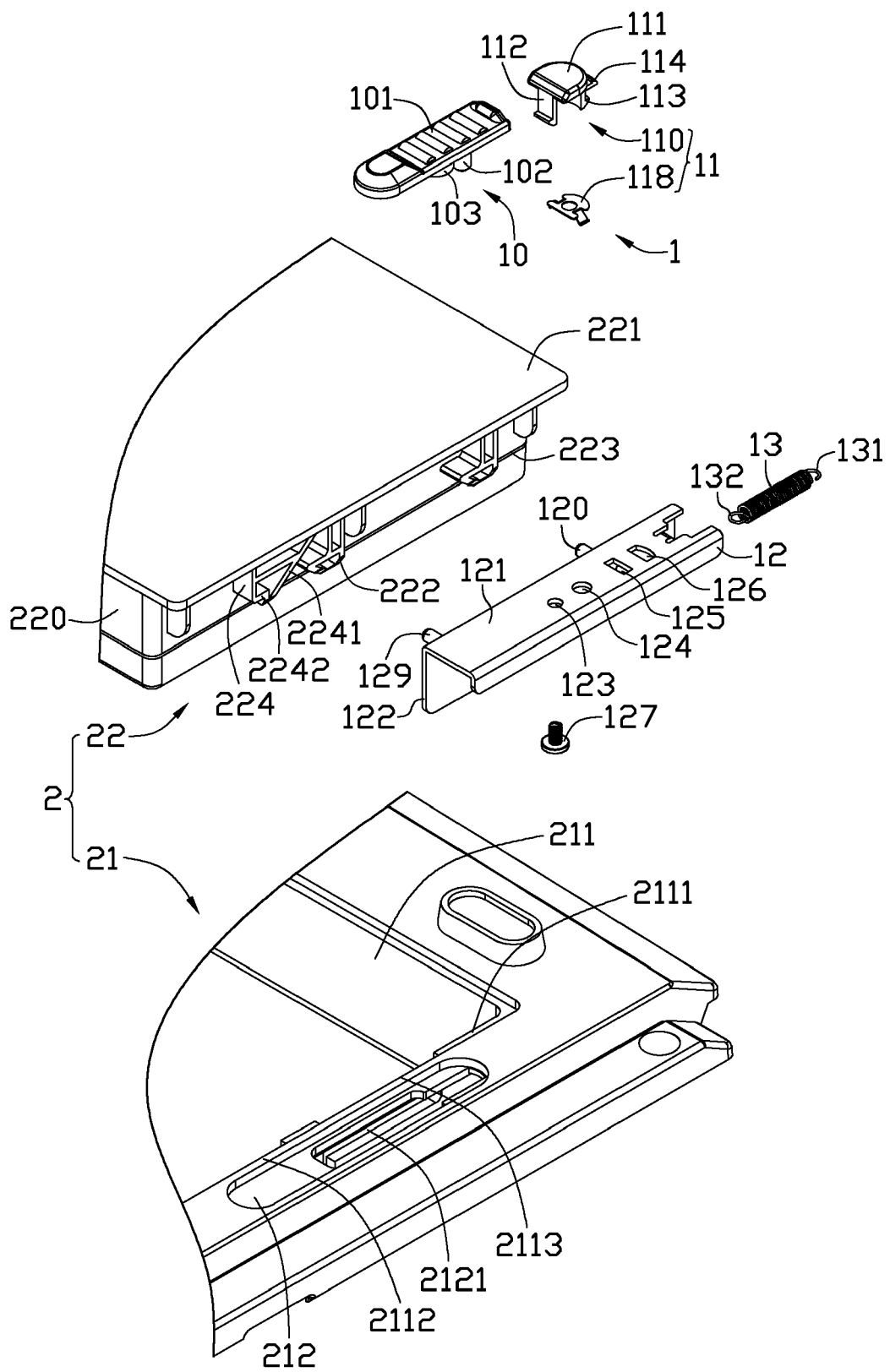
FIGS. 2-3 are partial, exploded perspective views of the electronic device with the battery lock of FIG. 1, showing opposite perspectives.
Figure 3:
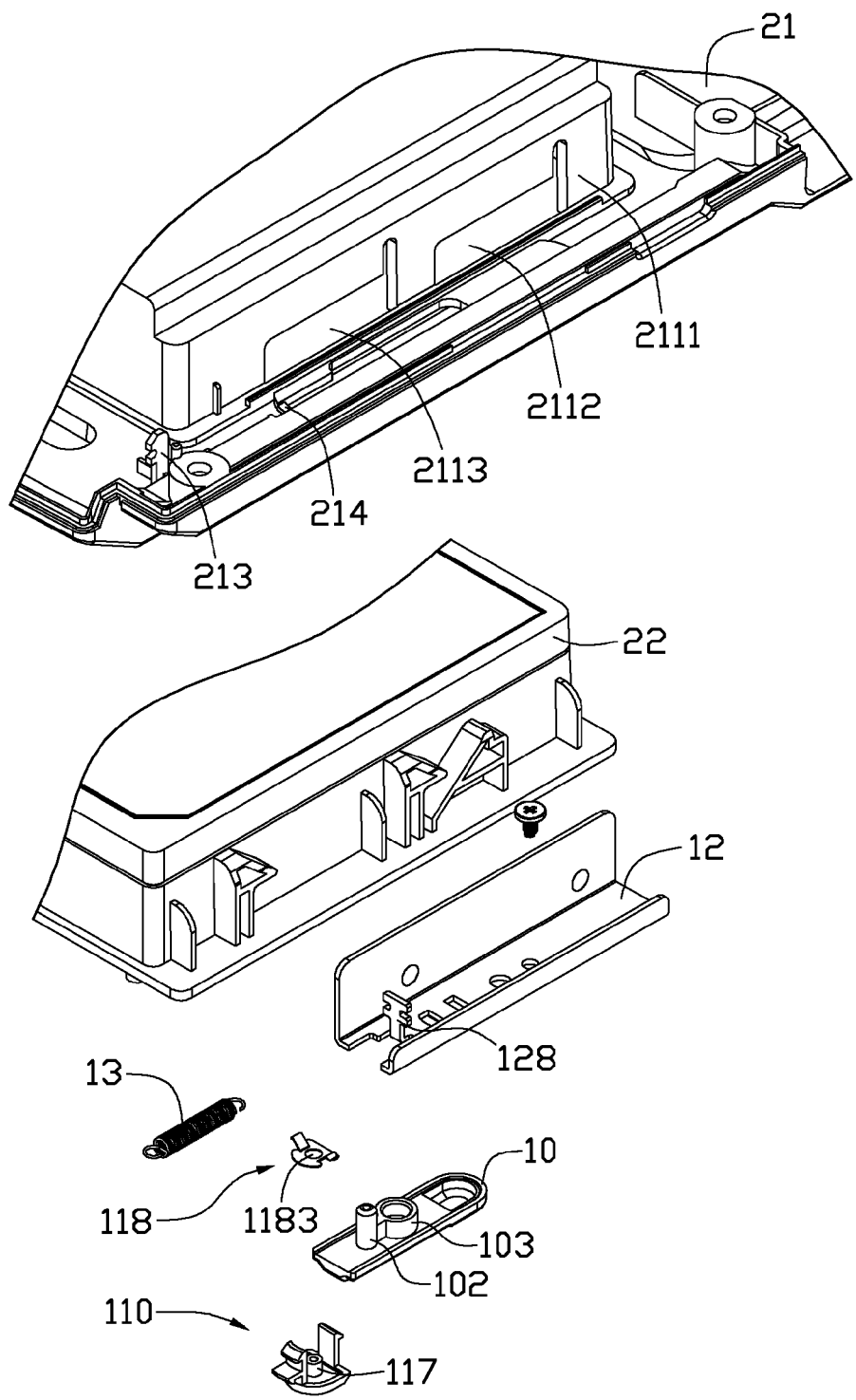

Referring to FIGS. 1-3, an electronic device with a battery lock is disclosed. The electronic device includes a battery lock 1 and an electronic apparatus 2. The battery lock 1 includes a sliding button 10, a locking member 11, a sliding member 12, and a spring member 13.

The sliding button 10 includes a sliding part 101, a position pin 102, and a securing portion 103. The position pin 102 and the securing portion 103 are fixed to a side of the sliding part 101.

The locking member 11 includes a pressing body 110 and a spring part 118. The pressing body 110 includes a pressing part 111, a first hook 112, a second hook 113, a third hook 114, and a post 117. The first hook 112 and the second hook 113 are fixed to a bottom side of the pressing part 111. The third hook 114 is defined on the second hook 113. The post 117 is fixed to the bottom side of the pressing part 111 and is positioned between the first hook 112 and the second hook 113.

A through hole 1183 is defined in the spring part 118, for receiving the post 117 therethrough.

The sliding member 12 includes a base part 121 and a side part 122 extending from the base part 121. The base part 121 includes a fastening part 123, a positioning hole 124, a first connection hole 125, and a second connection hole 126. In this exemplary embodiment, the fastening part 123 is a hole. Adjacent to the second connection hole 126 is a pothook 128 defined on the undersurface of the base part 121. A first pushing part 129 and a second pushing part 120 are fixed on the side part 122.

Two ends of the spring member 13 define a first clasp 131 and a second clasp 132 respectively. The first clasp 131 is configured to clasp the pothook 128 so as to connect the spring member 13 to the sliding member 12.

In this exemplary embodiment, the first hook 112 and the second hook 113 of the locking member 11 are placed in appropriate positions which respectively match with the first connection hole 125 and the second connection hole 126. For example, the first hook 112 and the second hook 113 are respectively passed through the first connection hole 125 and the second connection hole 126 so as to connect the locking member 11 to the sliding member 12.

The electronic apparatus 2 includes a housing 21 and a battery 22. The housing 21 defines a battery cavity 211 and a groove 212. The battery cavity 211 is for receiving the battery 22. A slot 2121 is defined on the base of the groove 212 for receiving the sliding button 10 and the locking member 11, and thus, the sliding button 10 and the locking member 11 can slide in the groove 212. Near to the groove 212, a sidewall 2111 of the cavity 211 includes a first hollow 2112 and a second hollow 2113 configured for passing through the first pushing part 129 and the second pushing part 120 respectively. The housing 21 further defines a protrusion 214 and a pothook 213 on its undersurface. The protrusion 214 matches with the third hook 114. The pothook 213 is configured for clasping the second clasp 132.

The battery 22 includes a battery body 220 and a connection end 221 extruded from the battery body 220. The connection end 221 includes a first supporting member 222, a second supporting member 223, and an unlocking member 224. The first supporting member 222 and the second supporting member 223 are respectively for supporting the first pushing part 129 and the second pushing part 120. The unlocking member 224 includes a chamfer 2241. A notch 2242 is formed in the end of the chamfer 2241.

Figure 4:
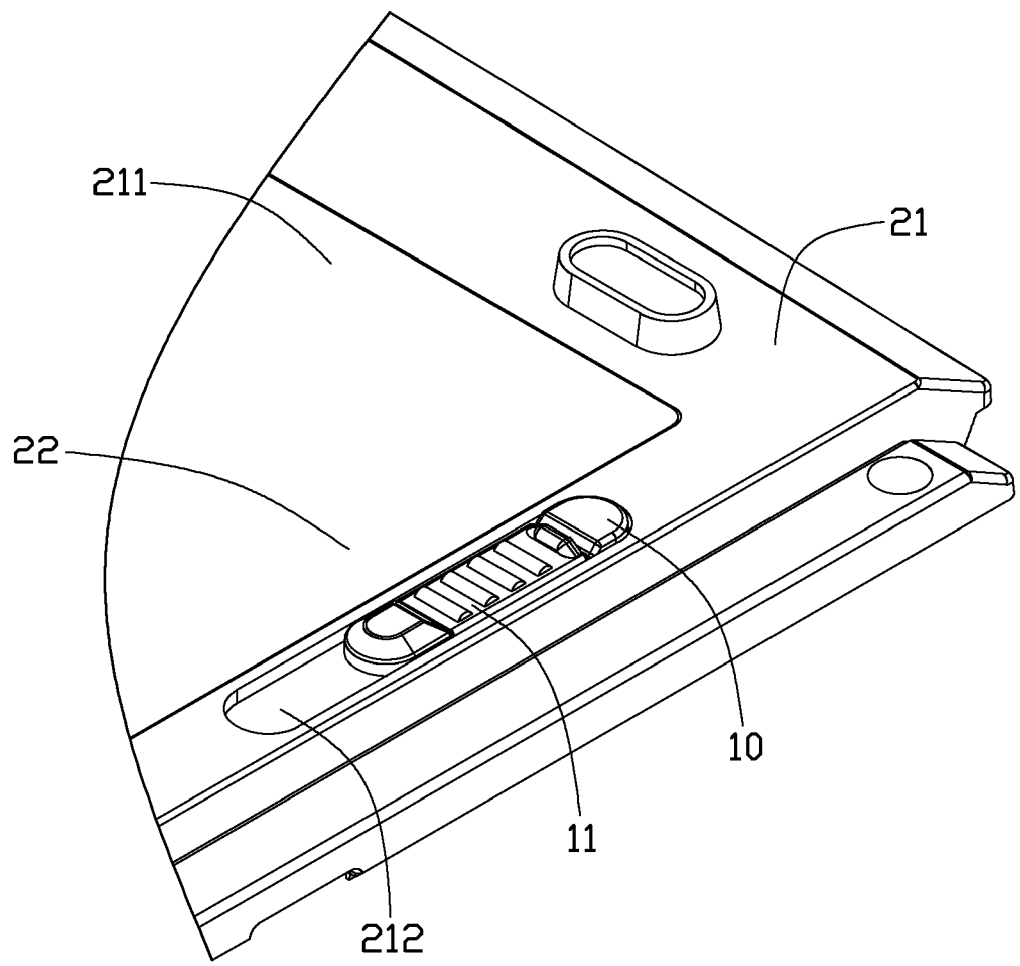
FIGS. 4-7 are partial, schematic diagrams for showing a process of assembling the battery lock to the electronic device of FIG. 1.
Figure 5:
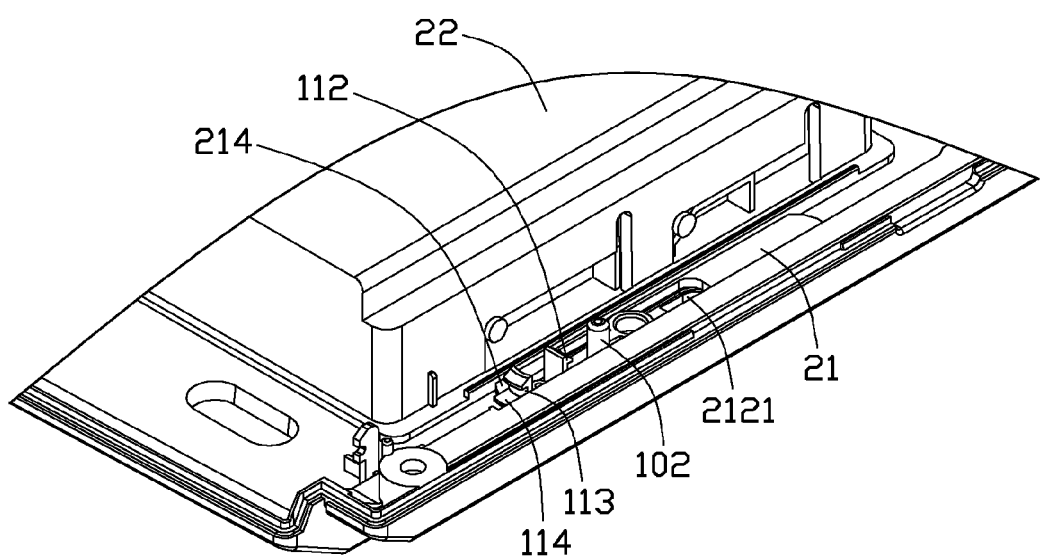
Figure 6:
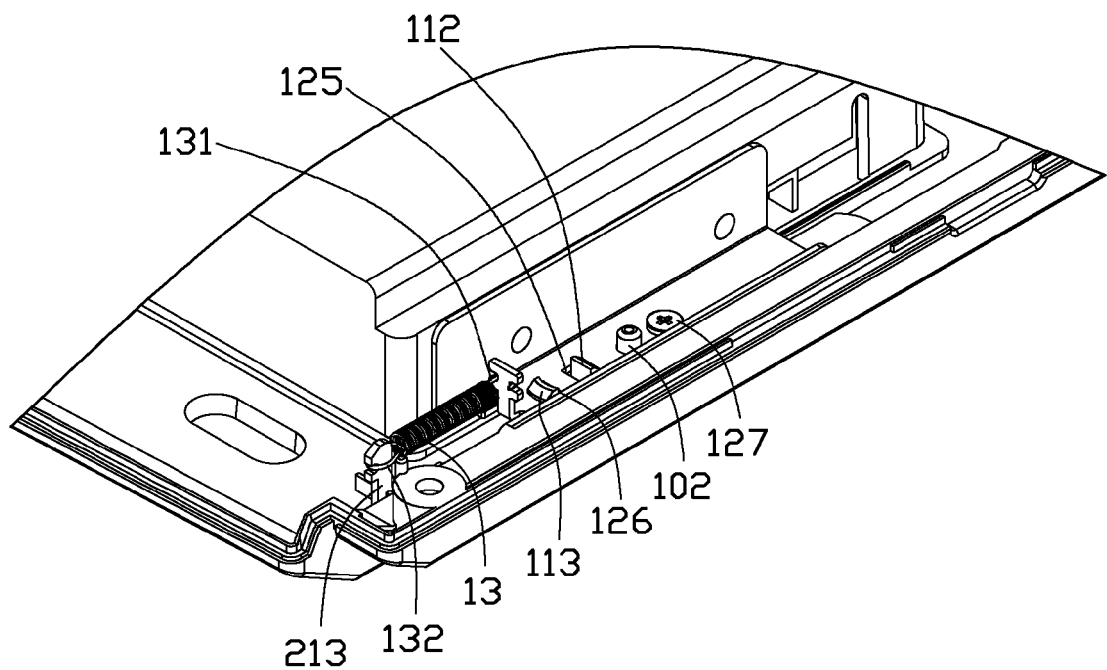
Figure 7:
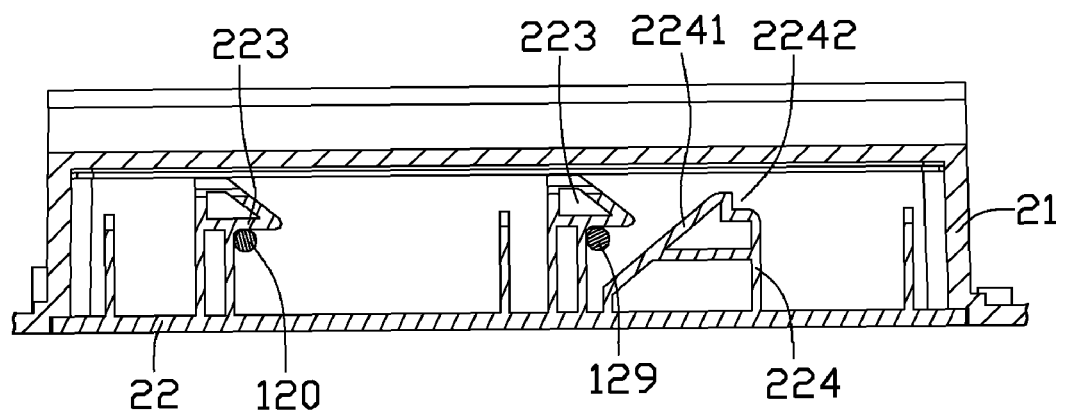

FIGS. 4-7 are schematic diagrams for showing the process of assembling the battery lock to the electronic device. Referring to FIG. 4 and FIG. 5, firstly, the position pin 102, the first hook 112, the second hook 113, and the spring part 118 are passed through the slot 2121 of the housing 21, and the spring part 118 is supported by the housing 21. The third hook 114 is hooked to the protrusion 214 of the housing 21. Referring also to FIG. 6, the position pin 102 of the sliding button 10 is passed through the positioning hole 124 of the sliding member 12. The first hook 125 and the second hook 126 are respectively passed through the first connection hole 125 and the second connection hole 126. The fastening part 123 is superposed with the securing portion 103. The first pushing part 129 and the second pushing part 120 are respectively inserted into the first hollow 2112 and the second hollow 2113, and supported by the first supporting member 222 and the second supporting member 223, as shown in FIG. 7. The first clasp 131 of the spring member 13 is clasped to the pothook 128 of the sliding member 12, and the clasp 131 of the spring member 13 is clasped to the pothook 213 of the housing 21. A fastening member 127 is used to fasten the battery lock to the housing 21 through the fastening part 123 and the securing portion 103.

Figure 8:
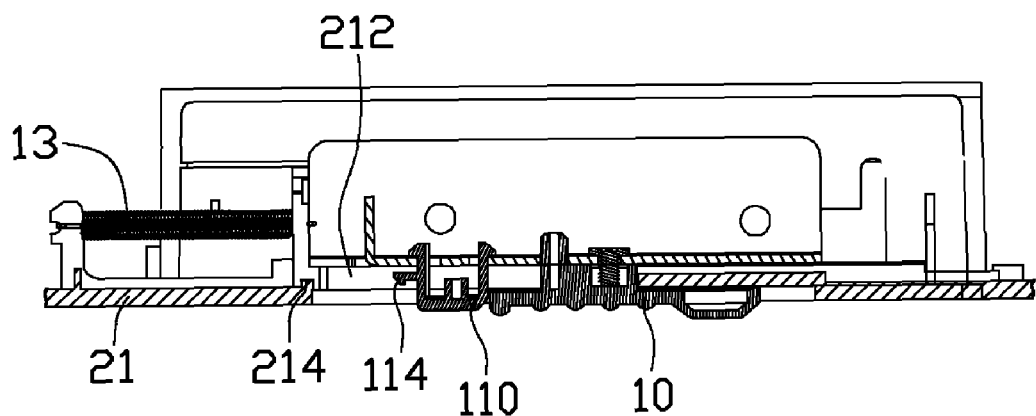
FIGS. 8-10 are cross-sectional views for showing a process of unlocking a battery of the electronic device using the battery lock.
Figure 9:
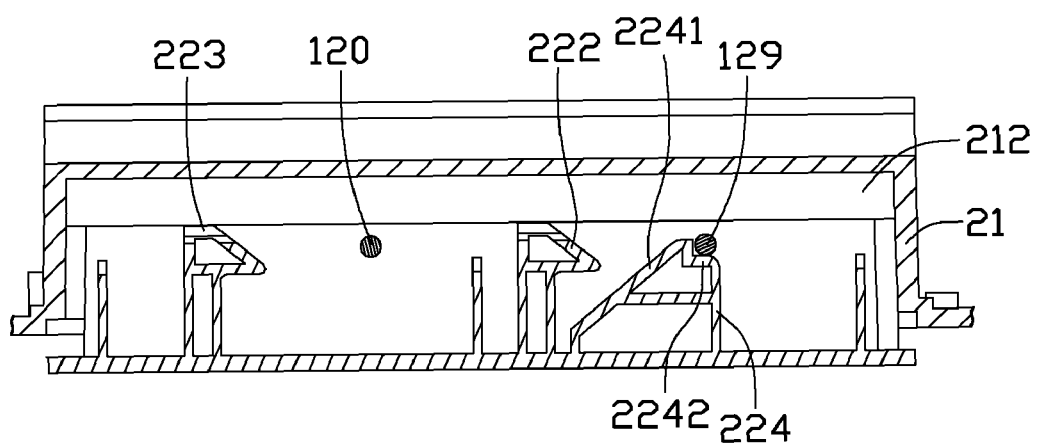
Figure 10:
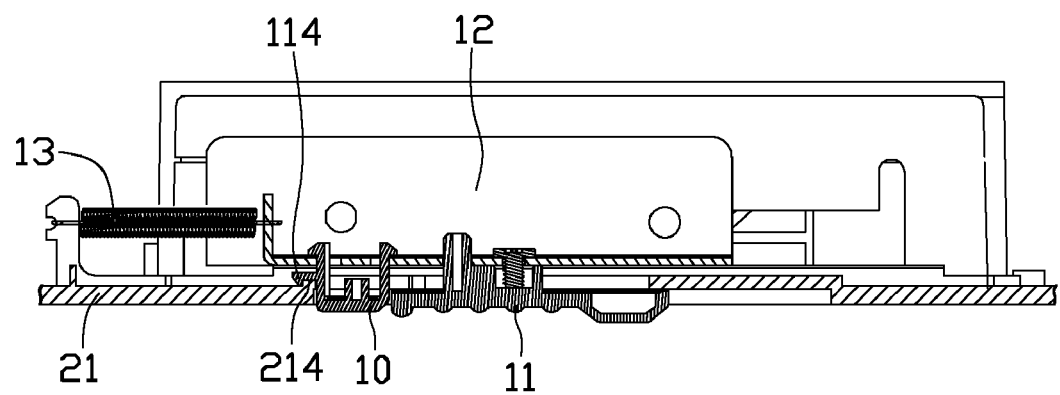

FIGS. 8-10 are schematic diagrams showing the battery 22 of the electronic apparatus 2 is locked and unlocked by the battery lock 1. After the battery lock 1 is assembled to the electronic apparatus 2, the first pushing part 129 and the second pushing part 120 are respectively supported by the first supporting member 222 and the second supporting member 223, thus, the battery 22 is locked by the battery lock 1, as shown in FIG. 7. As shown in FIG. 8, when the pressing part 111 of the locking member 11 is pressed, the locking member 11 is moved down along the first connection hole 125 and the second connection hole 126, the third hook 114 is free from the protrusion 214. The sliding button 10 is slid along the groove 212 and the sliding member 12 is slid with the sliding button 10. After being moved to the unlocking member 224, the first pushing part 129 goes on sliding along the chamfer 2241, and the unlocking member 224 is moved upwards. Referring also to FIG. 9, when being slid to the end of the chamfer 2241, the first pushing part 129 is received by and engaged with the notch 2242. Thus the battery 22 is unlocked. When the battery 22 is taken away, because of the elasticity of the spring member 13, the battery lock 1 resets to its original position. The third hook 114 of the locking hook 11 hooks the protrusion 214 of the housing 21 again, as shown in FIG. 10.

In another exemplary embodiment, the sliding member 12 only includes the first pushing part 129, the battery 22 only includes the first supporting member 222, and the housing 21 only includes the first hollow 2112.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A battery lock for locking a battery of an electronic apparatus, comprising:
    a sliding button comprising a sliding part for sliding the battery lock; and
    a sliding member comprising:
        a base part for assembling the sliding button comprising:
            a first connection hole;
            a second connection hole; and
        a side part extended from the base part for fixing at least one pushing part to lock the battery of the electronic apparatus; and
    a locking member comprising:
        a pressing body comprising:
            a pressing part;
            a first hook;
            a second hook; and
            a third hook; wherein the first hook and the second hook are fixed to the pressing part, a post is fixed to the pressing part and is positioned between the first hook and the second hook, the first hook and the second hook are respectively passed through the first connection hole and the second connection hole to assemble the locking member to the sliding member, and the assembled locking member is moved up and down along the sliding member;
        a spring part assembled between the pressing body and the base part of the sliding member;
    wherein when the locking member is assembled to the electronic apparatus, the third hook hooks the electronic apparatus.

2. An electronic device with a battery lock, comprising:
    a battery lock comprising:
        a sliding button comprising a sliding part for sliding the battery lock;
        a sliding member comprising:
            a base part for assembling the sliding button, the base part comprising a first connection hole and a second connection hole; and
            a side part extended from the base part for fixing; and
        a locking member comprising:
            a pressing body comprising:
                a pressing part;
                a first hook;
                a second hook; and
                a third hook; wherein the first hook and the second hook are fixed to the pressing part, a post is fixed to the pressing part and is positioned between the first hook and the second hook; the first hook and the second hook are respectively passed through the first connection hole and the second connection hole to assemble the locking member to the sliding member, and the assembled locking member is moved up and down along the sliding member; and
            a spring part being assembled between the pressing body and the base part of the sliding member; and
    an electronic apparatus comprising:
        a housing defining a battery cavity and a groove, wherein a slot is defined on the base of the groove for receiving the sliding button, a sidewall of the cavity comprises at least one hollow configured for passing through the at least one pushing parts of the sliding member, the housing comprising a protrusion, when the locking member is assembled to the electronic apparatus, the third hook hooks the protrusion of the housing; and
        a battery comprises:
            a battery body; and
            a connection end extruded from the battery body comprising:
                at least one supporting member being for supporting the at least one pushing part; and
                an unlocking member;
        wherein when the sliding button is slid along the groove, the at least one pushing part pushes the unlocking member to make the battery move upside so as to unlock the battery.

* * * * *